US010264324B2

(12) United States Patent
Fan

(10) Patent No.: US 10,264,324 B2
(45) Date of Patent: Apr. 16, 2019

(54) SYSTEM AND METHOD FOR GROUP-BASED MEDIA COMPOSITION

(71) Applicant: VideoSlick, Inc., San Jose, CA (US)

(72) Inventor: Zihong Fan, Los Altos, CA (US)

(73) Assignee: VideoSlick, Inc., San Jose, CA (US)

( * ) Notice: Subject to any disclaimer, the term of this patent is extended or adjusted under 35 U.S.C. 154(b) by 0 days.

(21) Appl. No.: 15/224,498

(22) Filed: Jul. 29, 2016

(65) Prior Publication Data

US 2017/0111668 A1    Apr. 20, 2017

Related U.S. Application Data

(60) Provisional application No. 62/236,837, filed on Oct. 2, 2015.

(51) Int. Cl.
*H04N 21/61* (2011.01)
*G11B 27/031* (2006.01)
*H04N 21/482* (2011.01)
*H04N 21/854* (2011.01)

(52) U.S. Cl.
CPC ....... *H04N 21/6125* (2013.01); *G11B 27/031* (2013.01); *H04N 21/4825* (2013.01); *H04N 21/854* (2013.01)

(58) Field of Classification Search
CPC ....... H04N 21/23424; H04N 21/63775; H04N 21/439; H04N 21/6125; G11B 27/031
See application file for complete search history.

(56) References Cited

U.S. PATENT DOCUMENTS

| | | | |
|---|---|---|---|
| 6,263,502 B1 * | 7/2001 | Morrison | H04N 5/44 348/563 |
| 8,875,184 B1 * | 10/2014 | Bakare | G06F 17/30867 725/41 |
| 9,414,121 B1 * | 8/2016 | Farber | H04N 21/233 |
| 9,635,400 B1 * | 4/2017 | Sherrets | H04N 21/25 |
| 2006/0195479 A1 * | 8/2006 | Spiegelman | G06F 17/30766 |
| 2008/0295028 A1 * | 11/2008 | Nagasaka | G06F 3/04817 715/810 |
| 2014/0282633 A1 * | 9/2014 | Fiero | H04N 21/4828 725/1 |
| 2016/0381341 A1 * | 12/2016 | El Choubassi | H04N 13/0011 348/43 |

* cited by examiner

*Primary Examiner* — Oschta I Montoya
(74) *Attorney, Agent, or Firm* — Fenwick & West LLP

(57) ABSTRACT

A system and method for group-based media composition is disclosed. This system has three modules. The first one is a grouping module, which associates content files into groups. This allows content files to be grouped logically or temporally. The second module is an operation selection module, which allows operations to be applied to each content file. The third module is a composition module, which uses the grouping and content operation information to create a desired composition.

15 Claims, 6 Drawing Sheets

SYSTEM AND METHOD FOR GROUP-BASED MEDIA COMPOSITION

This application claims the benefit of U.S. Provisional Application No. 62/236,837, filed Oct. 2, 2015, the disclosure of which is hereby incorporated herein by reference.

FIELD OF THE INVENTION

Background of the Invention

The specification relates to a media composition system. In particular, it relates to a system for group-based media composition. One application of this system is for automatic audio creation, including automatic music creation. Another application of this system is for automatic video editing. Increasing numbers of users view content, such as video data and there is high demand for video creation both for individual and business usage. Video editing consumes a lot of time and requires editing skills. For professional-quality video, existing methods require manual editing skills, which is expensive and time consuming. For non-professional video, eg: filter-based and template-based automatic video editing tools, existing methods lead to the same style and do not provide flexibility and uniqueness for each generated video.

SUMMARY OF THE INVENTION

In accordance with an embodiment, a system for grouping content for automatic video editing including a content composition site is described. A content composition site manages content such as videos that are accessed by clients. Publishers upload video content to the content composition site. The content composition site pushes videos uploaded by publishers to the client. In one embodiment, the client uploads video content.

In one embodiment, the content composition site manages pictures that are accessed by clients. Publishers upload picture content to the content composition site. The content composition site pushes pictures uploaded by publishers to the client. In one embodiment, the client uploads picture content. In another embodiment, content composition takes place on the client device, and no upload is required.

Specifically, embodiments disclosed herein provide a system for grouping content for automatic video editing. The system comprises a grouping module, an operation selection module, and a composition module. The grouping module associates content together visually as a list of groups, where each group contains associated content. Content can be added to a group, reordered within a group, or moved between groups. Groups can be added to or deleted from the list of groups, and groups can be reordered within the group list. Groups are independent of each other. The operation selection module allows easy selection from a set of instructions from the user on how content should be used. The composition module transforms the groups, content and operations into an automatically generated video. The group composition interface not only provides the flexibility of composing videos the way a user wants, but also gives the system the flexibility to better optimize and process very complex content compositions.

In one embodiment, the system automatically generates a video based on the group, operation and content data responsive to a user input indicating that the user wants to create a video. For example, a user first uploads multiple content files and the content composition site presents an interface to the user allowing them to upload additional content files, group the content, and select appropriate operations to apply to the content. The user adds additional content, associates content to appropriate groups, sets content operations, and instructs the content composition site to generate a video. In another example, the user selects content files to upload, and is presented with an interface to select additional content files, group content and set content operations before they are uploaded. The user selects additional files, associates content with appropriate groups, sets appropriate content operations, and instructs the content composition site to upload the content files and generate a video. For each high level operation and each group, the system automatically determines the best parameters for that group, which includes, but is not limited to, editing parameters and analysis of visual content, audio content and text content.

In one embodiment, the uploaded content consists entirely of music and audio content. In another embodiment, uploaded content consists of a mixture of text, video, and audio content.

In one embodiment, content within a group, and the list of groups is unordered. In another embodiment, the content composition system will use the ordering of groups and the order of content within a group to determine the order to compose content in the final composition.

In one embodiment, groups can only contain content. In another embodiment, groups can contain other groups.

In one embodiment, there can only be one group. In another embodiment, there can be many groups that are created by the user.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

Like reference numerals refer to like parts throughout the several views of the drawings.

DESCRIPTION OF THE INVENTION AND PREFERRED EMBODIMENTS

Figure 1:
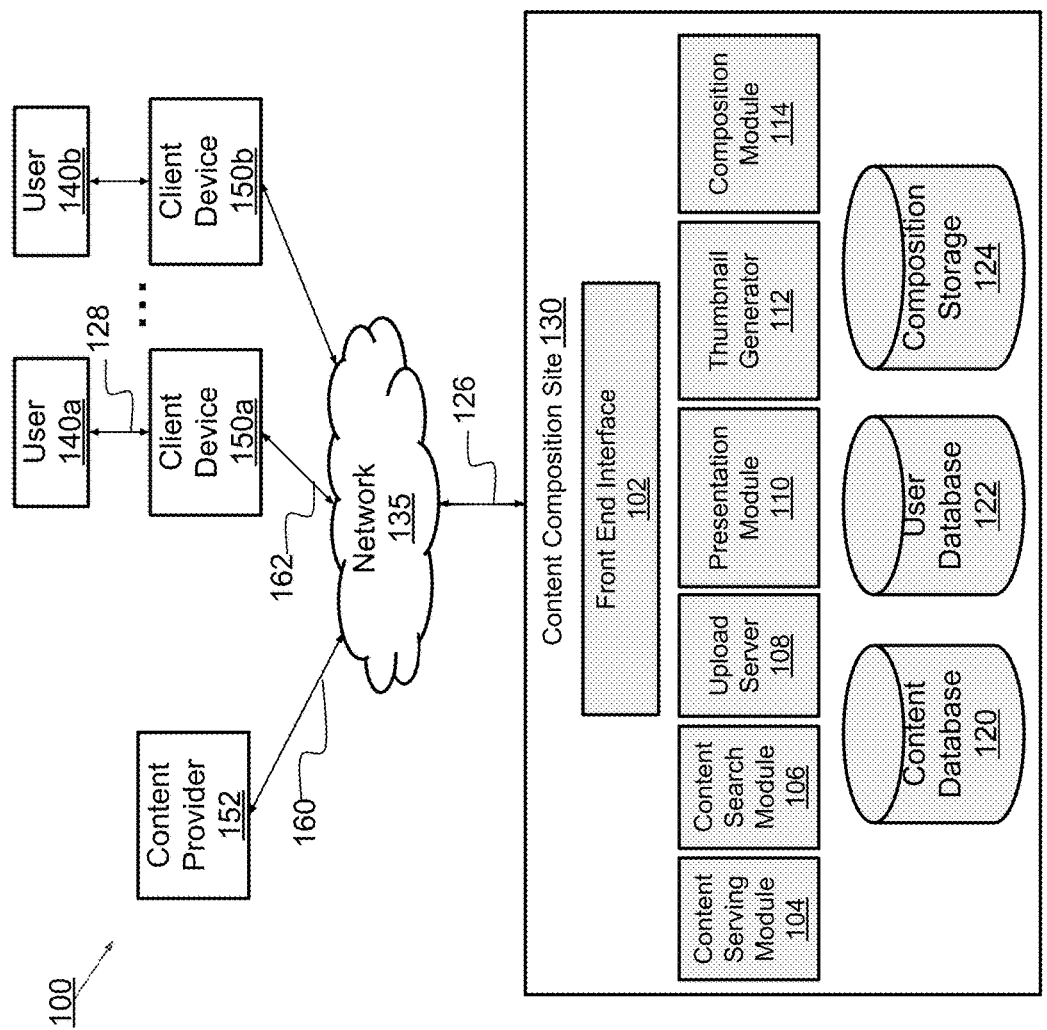
FIG. 1 is a high level block diagram illustrating a system for group-based media composition.

A system and method for group-based automatic video editing is described below. In the following description of the embodiments, for purposes of explanation, numerous specific details are set forth to provide a thorough understanding of the various embodiments. However, it will be apparent to one skilled in the art that the various embodiments can be practiced without these specific details. In other instances, structures and devices are shown in block diagram form in order to avoid obscuring the certain details.

For example, an embodiment is described below with reference to user interfaces and particular hardware. However, other embodiments can be described with reference to any type of computing device that can receive data and commands, and any peripheral devices providing services.

Reference to "one embodiment" or "an embodiment" means that a particular feature, structure, or characteristic described in connection with the embodiment is included in at least one embodiment. The appearances of the phrase "in one embodiment" in various places in the description are not necessarily all referring to the same embodiment.

Some portions of the following description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following description, it is appreciated that throughout the description terms such as "processing," "computing," "calculating," "determining," "displaying" or the like, refer to the action and processes of a processor-based computer system, or similar electronic computing device, such as a mobile phone, camera, camcorder, tablet, etc, that manipulates and transforms data represented as physical (electronic) quantities within the computer system's registers and memories into other data similarly represented as physical quantities within the computer system's memories or registers or other such information storage, transmission or display devices. The present embodiments also relate to an apparatus for performing the operations herein. This apparatus may be specially constructed for the required purposes, or it may be a general-purpose computer selectively activated or reconfigured by a computer program stored in the computer. The embodiments disclosed may take the form of an entirely hardware embodiment, an entirely software embodiment or an embodiment including both hardware and software elements. One embodiment is implemented in software comprising instructions or data stored on a computer-readable storage medium, which includes but is not limited to firmware, resident software, microcode or another method for storing instructions for execution by a processor.

Furthermore, the embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card. Examples of optical disks include compact disk-read only memory (CD-ROM), compact disk-read/write (CD-R/W) and digital video disc (DVD).

The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the disclosure herein, or it may prove convenient to construct more specialized apparatus to perform the required method steps. The required structure for a variety of these systems will appear from the description below. It will be appreciated that a variety of programming languages may be used to implement the disclosure of the embodiments as described herein.

FIG. 1 is a high-level block diagram illustrating an embodiment of a system 100 for group-based media composition. Content, as used herein, includes videos, pictures, audio, music, and text hosted by the content composition site 130. The illustrated embodiment of the system 100 includes: client devices 150*a*, 150*b* (referred to collectively or individually as client devices 150) that are accessed by users 140*a*, 140*b* (referred to collectively or individually as users 140), a content provider 152, and a content composition site 130. The content composition site 130 includes, among other elements described below, a composition module 114.

Although only one content provider 152, two client devices 150 and one content composition site 130 are illustrated in FIG. 1, persons having ordinary skill in the art will recognize that any number of content providers 152, client devices 150 and content composition sites 100 can be communicatively coupled to the network 135. Furthermore, while only one network 135 is coupled to the client devices 150, the content provider 152 and the content composition site 130, persons having ordinary skill in the art will appreciate that any number of networks 135 can be connected to the client devices 150, the content provider 152 and the content composition site 130.

The network 135 is a conventional type of network, wired or wireless, and may have any number of configurations such as a star configuration, token ring configuration or other configurations known to those skilled in the art. In one embodiment, the network 135 comprises one or more of a local area network (LAN), a wide area network (WAN) (e.g., the Internet), and/or any other interconnected data path across which multiple devices communicate. In another embodiment, the network 135 is a peer-to-peer network. The network 135 is coupled to or includes portions of a telecommunications network for sending data in a variety of different communication protocols. For example, the network 135 is a 3G network or a 4G network. In yet another embodiment, the network 135 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 135 are encrypted using conventional encryption technologies such as secure sockets layer (SSL), secure HTTP and/or virtual private networks (VPNs).

In the illustrated embodiment, the content composition site 130 is communicatively coupled to the network 135 via signal line 126. The content provider 152 is communicatively coupled to the network 135 via signal line 160. The client 150a is communicatively coupled to the network 135 via signal line 162. The user 140a interacts with the client device 150a as represented by signal line 128. Client device 150b and user 140b are coupled and interact in a similar manner.

The content composition site 130 is any system that allows a user to access intellectual property content via searching and/or browsing interfaces. It will be understood that the term "web site" represents any computer system adapted to serve content using any internet working protocols, and is not intended to be limited to content uploaded or downloaded via the Internet or the HTTP protocol.

In one embodiment, the content composition site 130 is configured to receive and share all or a portion of any content such as a video or a picture. Persons having ordinary skill in the art will also recognize that the content can be represented in any media type and/or file type. For example, the content composition site 130 shares content such as one or more of a video file and an image file (such as a JPEG or GIF file).

Sources of contents provided by the content composition site 130 are from uploads of contents by users 140 operating a client device 150, searches or crawls of other web sites or databases of contents, or the like, or any combination thereof. For example, in one embodiment, a content composition site 130 is configured to allow uploads of contents by users 140. In another embodiment, the content composition site 130 is configured to only obtain contents from other sources by crawling such sources or searching such sources in real time. In another embodiment, the content composition site 130 is configured to obtain content from external web sites (not shown), such as a social media web site, using a user's login information.

The content composition site 130 is communicatively coupled to the network 135. In the illustrated embodiment, the content composition site 130 includes: a front end interface 102; a content serving module 104; a content search module 106; an upload server 108; a presentation module 110; a thumbnail generator 112; a user database 122; a content database 120; a composition storage 124; and a composition module 114. In one embodiment, the components of the content composition site 130 are communicatively coupled to one another. For example, they are communicatively coupled to one another via a bus (not pictured). Other conventional features, such as firewalls, load balancers, authentication servers, application servers, failover servers, site management tools, and so forth are not shown so as not to obscure the feature of the system.

In one embodiment, the illustrated components of the content composition website 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the content composition site 130 are performed by one or more client devices 150 in other embodiments if appropriate. In one embodiment, the functionality attributed to a particular component is performed by different or multiple components operating together.

In one embodiment, each of the various modules are implemented as a server program executing on a server-class computer comprising one or more central processing units ("CPU," or "CPUs" if plural), memory, network interface, peripheral interfaces, and other well-known components. The computers themselves preferably run an open-source operating system such as LINUX, have generally high performance CPUs, 1 gigabyte or more of memory, and 100 gigabyte or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in tangible computer accessible storage mediums (e.g., random access memory ("RAM"), flash, hard disk, optical/magnetic media, or solid-state drive ("SSD"), etc.).

The front end interface 102 is an interface that handles communication with one or more of the content provider 152 and the client devices 150 via the network 135. For example, the front end interface 102 receives a content file uploaded from the content provider 152 and delivers the content to the upload server 108. In one embodiment, the front end interface 102 receives requests from users 140 of the client devices 150 and delivers the requests to the other components of the content composition site 130 (e.g., the content search module 106 or the content serving module 104). For example, the content is a video and the front end interface 102 receives a video search query from a user and sends the video search query to the content search module 106.

The upload server 108 receives one or more content files from the content provider 152 via the front end interface 102. For example, the upload server 108 receives one or more of a video file and an image file such as a JPEG or GIF from the content provider 152. In one embodiment, the upload server 108 processes the one or more contents and stores the processed contents in the content database 120. The upload server 108 assigns a content identification ("content ID") to the stored content file. A content ID includes identifiers for videos ("video ID") and pictures ("image ID"). For example, the upload server 108 assigns a video ID to a video and stores the video together with the video ID in the content database 120. In other embodiments, the upload server 108 performs one or more of: formatting a content; compressing a content; metadata tagging a content; content analysis, etc.

The content database 120 is a storage system that stores content shared by the content composition site 130 with the users 140. In one embodiment, the content database 120 stores the content files processed by the upload server 108. In another embodiment, the content database 120 also stores metadata associated with the content files. The metadata includes one or more of: a title; a description; tag information; a time length; and the like. In one embodiment, some or all of the metadata of the content files is provided by the content provider 152. For example, a user of the content provider 152 provides a title and a description of a content when uploading the content to the content composition site 130.

The content search module 106 includes code and routines that, when executed by a processor (not pictured), processes any search queries received by the front end interface 102 from users 140. A search query received by the front end interface 102 from a user 140 includes search criteria such as keywords that identify content the user is interested in. The content search module 106 uses the search criteria to query the metadata of the content files stored in the content database 120. The search results for the query are returned to the front end interface 102 for presentation to the user 140. For example, if a user 140 provides the front end interface 102 with a keyword search query, the content search module 106 identifies a content file stored in the content database 120 related to the keyword and returns the search result (e.g., content IDs and/or metadata such as titles, descriptions, thumbnails of the identified content files) to the front end interface 102.

The content serving module 104 includes code and routines that, when executed by a processor (not pictured), processes requests for a content (e.g., a video, a book, a picture, a music file, etc) and provides the content to users. For example, the content serving module 104 receives a query from a user via the front end interface 102, retrieves a set of videos from the content database 120 based at least in part on the query and presents the set of videos to the user via the front end interface 102.

In one embodiment, the content serving module 104 receives a request from a user to access a content when the user clicks on a link to the content. The request received from the user includes the content ID of the content that the user wishes to access. In one embodiment, the content ID is included automatically in the request once the user clicks on the link for the content. The content serving module 104 uses the content ID to search and locate the content in the content database 120. Once the requested content is located, the content serving module 104 transmits the content to the user via the front end interface 102. The content is presented to the user on a web page. Metadata associated with the content is also presented with the content, such as the title and description of the content. In one embodiment, the content serving module 104 stores the content ID of the content in the user database 122 after sending the content to the user so that a content history of the user is stored in the user database 122.

The user database 122 is a storage system that stores data and/or information associated with a user. For example, the user database 122 stores the content IDs of content files uploaded by a user to the content composition site 130 and the content IDs of content files that the user has accessed from the content database 120. In one embodiment, the user is identified by using a login name and password and/or by using the user's internet protocol address.

The thumbnail generator 112 includes code and routines that generates a thumbnail for a content. A thumbnail is a picture that represents content in the content composition site 130. For example, assume the content is a video. The thumbnail generator 112 analyzes the video and selects a frame of the video as the thumbnail. In one embodiment, the thumbnail generator 112 provides one or more pictures for the video and the user uploading the video to the content composition site 130 selects one picture as the thumbnail.

The presentation module 110 includes code and routines that, when executed by a processor (not pictured), presents any information intended for a user to a corresponding client device such as the client device 150. For example, the presentation module 110 generates a graphic associated with the contents stored in the content database 120 and sends the graphic to a web browser (not pictured) installed in the client device 150 via the front end interface 102 and the network 135.

The content provider 152 is any device that provides contents to the content composition site 130. For example, the content provider 152 is a computing device that uploads a content to the content composition site 130. The content provider 152 is communicatively coupled to the network 135. In one embodiment, the content provider 152 is also a client device 150. In one embodiment, the content provider 152 is the same entity that operates the content composition site 130.

In one embodiment, the content provider 152 is configured to operate a client device to perform various content provider functions. Examples of the content provider functions include, but are not limited to: uploading a content to the content composition site 130; editing a content stored by the content composition site 130; removing a content from the content composition site 130; and editing content provider preferences associated with a content.

The client devices 150 are any processor-based computing devices. The client device 150 executes client software such as a web browser or built-in client application and connects to the content composition site 130 via the network 135. In one embodiment, the client device 150 includes a variety of different computing devices. Examples of a client device 150 include, but are not limited to: a personal computer; a personal digital assistant; a television set-up box; a tablet computer; a smart phone; and a laptop computer. The client device 150 comprises a processor (not pictured), a memory (not pictured) and other components conventional to a computing device. In one embodiment, the client device 150 is communicatively coupled to the network 135.

In one embodiment, the client device 150 is configured as a content provider 152 to provide contents to the content composition site 130. In one embodiment, the client device 150 is configured to retrieve contents stored by the content composition site 130. For example, the client device 150 includes an embedded video player (e.g., the Flash™ player from Adobe System, Inc.) adapted for the video content formats used in the content composition site 130 so that a user is able to view a video from the content composition site 130 using the embedded video player.

In one embodiment, the composition module 114 exists on the client device 150, and no network 135 is required.

In one embodiment, a user 140 uses an interface provided on client device 150 to request composition module 114 to create a new composition based on grouping information via front end interface 102 and network 135. In one embodiment, the new composition is stored to the composition storage 124.

Figure 2:
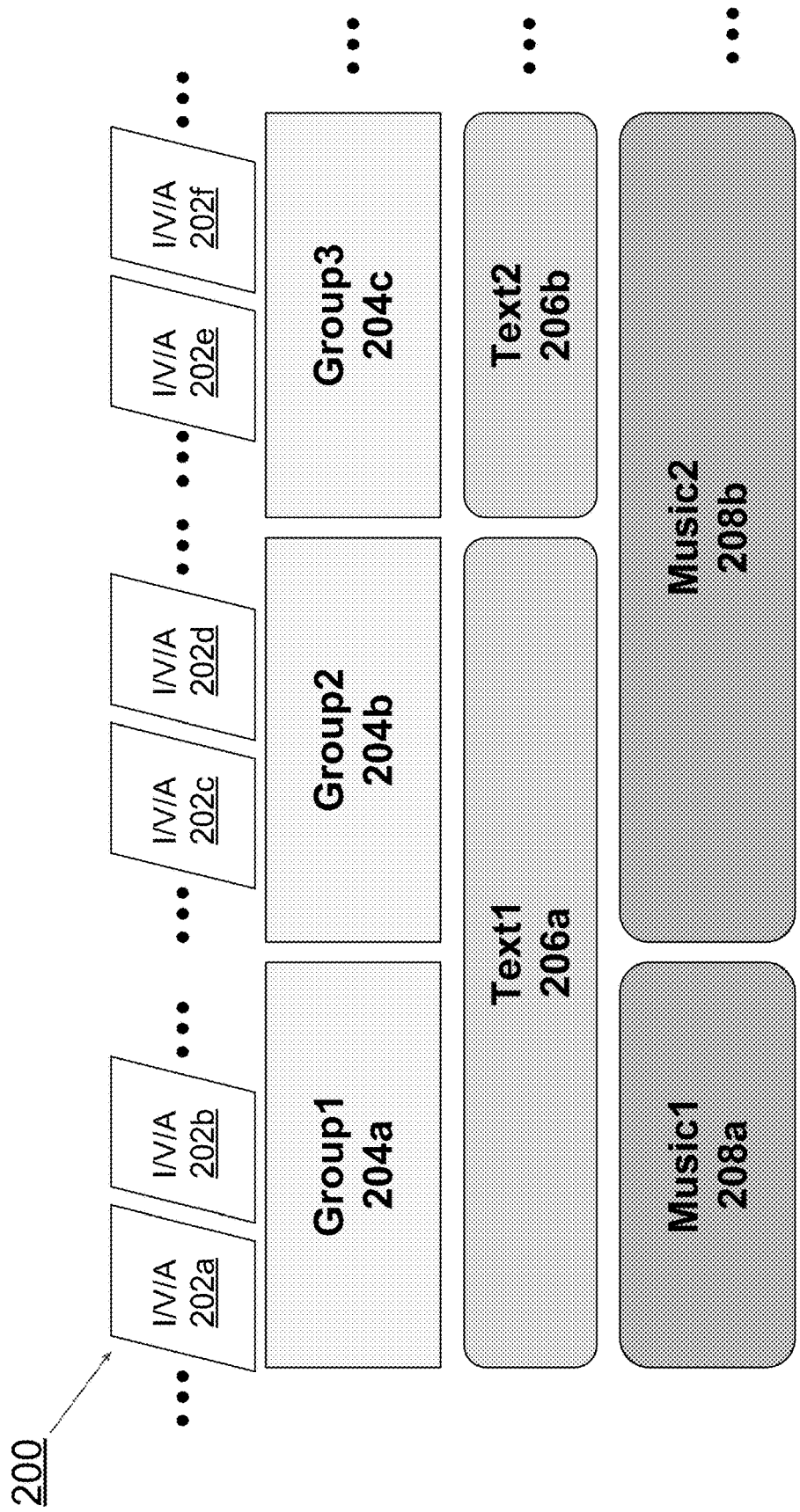
FIG. 2 is a diagram illustrating how a grouping module associates content with a list of groups.

FIG. 2 is a diagram illustrating how a grouping module associates content with a list of groups. The illustration includes: Content 202a4 that is associated with groups 204a-c, text 206a-b that is associated with one or more groups 204a-c, and music 208a-b that is associated with one or more groups 204a-c.

In one embodiment, a grouping module includes code and routines that, when executed, presents a list of groups 204a-c in an interface to the user in order, showing the order in which they will be composed. Content 202a-f is shown to be associated with particular groups. In one embodiment, groups can contain other groups. In another embodiment, groups can only contain content. See FIGS. 5 and 6 for graphic representations of associating content with groups.

In one embodiment, a grouping module presents groups 204a-c in an interface showing some logical similarity between content within a group. In one embodiment, group 204a shows image content, group 204b shows video content, and group 204c shows music content.

Responsive to a user input including data that the user wants to add a group to the list, a grouping module can add additional groups to the list of groups 204a-c. In one embodiment, the new group is added to the end of the list of groups 204a-c. No content is associated with the new group.

Responsive to a user input including data that the user wants to remove a group from the list, a grouping module can remove group 204a from the groups 204a-c. The group module presents an updated interface to the user to show the updated list of groups with only group 204b and group 204c. In one embodiment, the content associated with the removed group 204a is removed entirely. In one embodiment, the content associated with the removed group 204a is added to another group, such as group 204b.

In one embodiment, a grouping module allows groups 204a-c to be rearranged. Responsive to user input that group 204a be moved between group 204b and group 204c, the grouping module will present the user with an updated interface showing group 204b first, group 204a second, then group 204c last.

In one embodiment, a grouping module associates a name with each group and presents the name to the user in an interface. In one embodiment, the grouping module presents an interface to the user allowing them to enter a name for each group. In one embodiment, the grouping module automatically names groups 204a-c according to the natural order in the group list.

In one embodiment, the grouping module stores group and content order information to non-transitory storage medium. In one embodiment, this non-transitory storage medium is a grouping database. In another embodiment, the non-transitory storage medium is a dynamic random access memory device (DRAM).

In one embodiment, responsive to a user input that the user desires to restore a previous grouping, the grouping module can restore group and content order information from a non-transitory storage medium. In one embodiment, this non-transitory storage medium is a grouping database. In another embodiment, this non-transitory storage medium is a hard disk.

In one embodiment, responsive to user input that content 202a-b be added to a group 204a, the grouping module inserts content 202a in group 204a, and inserts content 202b behind content 202a in group 204a. In one embodiment, the user input is a pointing device, such as a mouse, that allows the user indicate which of the groups 204a-c to add content to, and in what position within a group to add the content to. In one embodiment, new content is added to a list of content that is displayed separately from the groups. In one embodiment, new content is always added to the end of the first group, 204a.

In one embodiment, responsive to user input that content 202a be removed from group 204a, the grouping module removes content 202a from group 204a, and presents an updated interface to the user showing that content 202a is no longer in group 204a. In one embodiment, the removed content is added to a list of content that is displayed separately from the groups.

In one embodiment, the grouping module allows text 206a-b to be associated with one or more groups. Responsive to user input that text 206b be added to group 204b, the grouping module presents an updated interface to the user to show the text 206b associated with the group 204b. In one embodiment, the text is shown in the group list. In another embodiment, the text is shown along side the content in the group list, and associated with the whole group. In one embodiment, text can be associated with a sequence of content within a single group. In another embodiment, text can be associated with a sequence of content that spans multiple groups.

In one embodiment, the grouping module allows music 208a-b to be associated with one or more groups. Responsive to user input that music 208a be added to group 204a, the grouping module presents an updated interface to the user to show music 208a associated with the group 204a. In one embodiment, the music is shown in the group list. In one embodiment, the music is shown along side the content in the group list, and associated with the whole group. In one embodiment, music can be associated with a sequence of content within a single group. In one embodiment, music can be associated with a sequence of content that spans multiple groups.

In one embodiment, the content in each group are one or more image files, and a single music track. The composition module 114 creates a video that shows the images in groups 204 in sequence for a fixed amount of time and plays music 208 associated with groups 204. Music 208a is played while the images in group 204a are shown. Once the images in group 204a have been shown, the composition module plays the images in group 204b with music 208b.

It will be apparent to one skilled in the art that the various embodiments can be practiced without these specific details.

Figure 3:
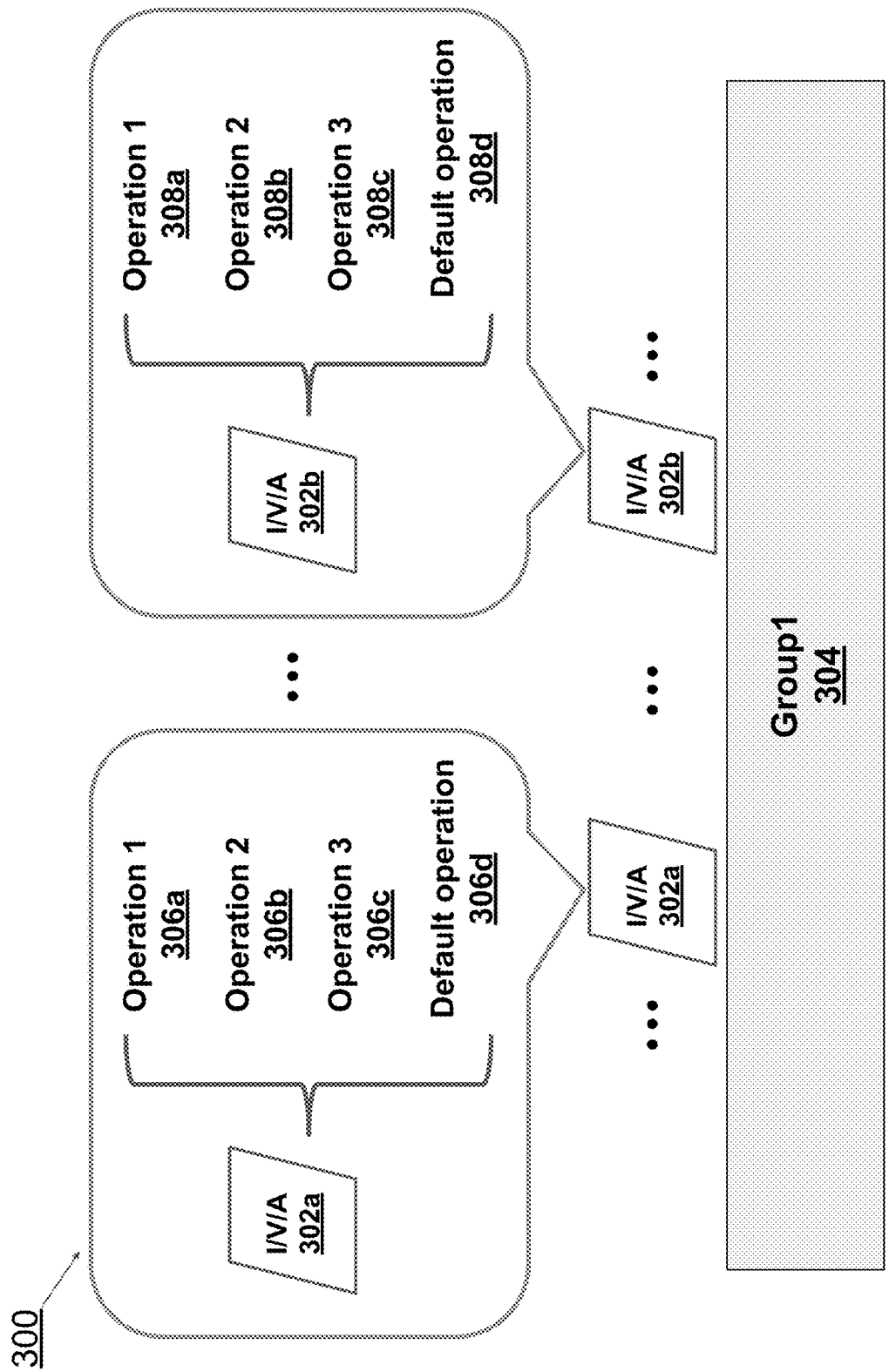
FIG. 3 is a diagram illustrating how an operation selection module selects different operations to apply to content.

FIG. 3 is a diagram illustrating how an operation selection module selects different operations to apply to content. The illustration includes content 302a-b that is associated with group 304. Operations 306a-d and 308a-d capture some intent from the user as to how the composition module 114 should process content 302a-b. An example of an operation is whether or not to apply a Ken Burns effect on some image content.

In one embodiment, an operation selection module includes code and routines that, when executed, presents an interface to the user to choose a single operation to perform on content 302a. In one embodiment, an operation is chosen by default for content. In one embodiment, the default operation depends on the type of content, (video, image, etc. . . . ). Responsive to a user input to select an operation 306a, the operation selection module associates the operation with content 302a, and sends an updated interface to the user with an indication that operation 306a has be selected.

In one embodiment, an operation selection module presents an interface to the user to choose any number operations from a list of operations to perform on content 302a. Responsive to a user input to select operations 306b and 306c, the operation selection module associates operations 306b and 306c with content 302a, and ends an updated interface to the user with an indication that operations 306b and 306c have been selected.

Figure 4:
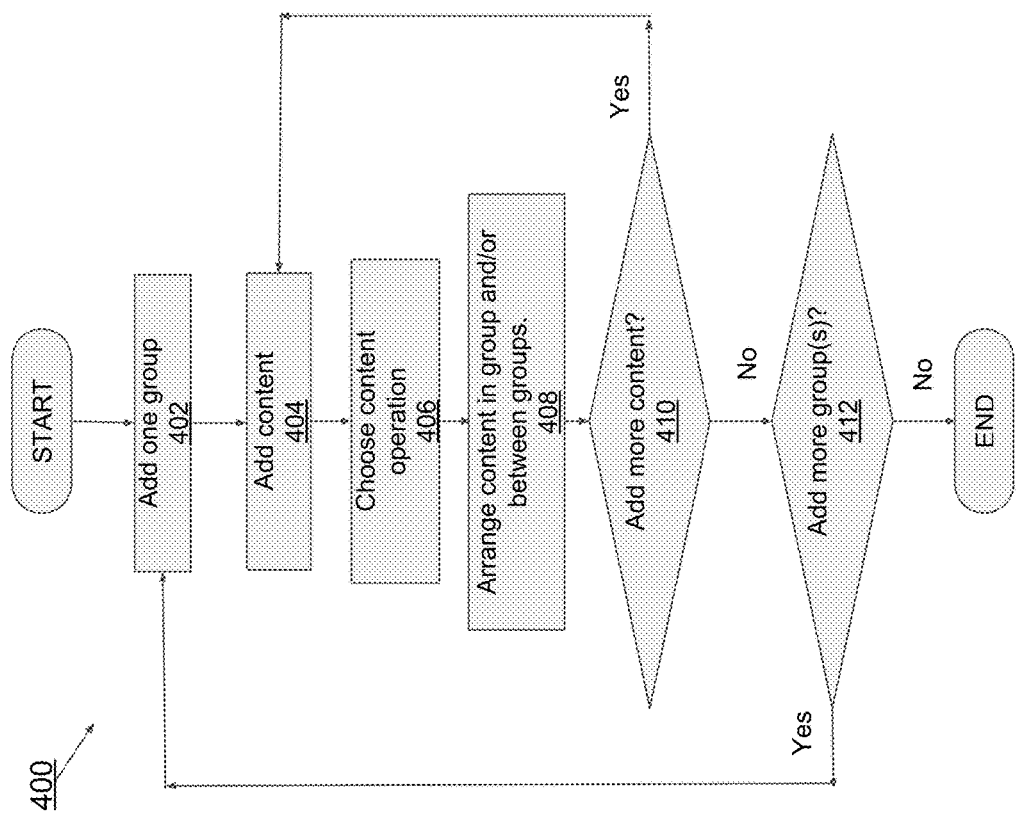
FIG. 4 is a flow diagram illustrating the process of creating groups and associating content with them.

FIG. 4 is a flow diagram illustrating the process of creating groups and associating content with them. A user first add groups to the group list in step 402. In one embodiment, a default group is already added to the group list. The user then adds new content to a group in step 404, selecting the content they will to add. For each content, the user has a choice to pick a custom operation to perform on the content in step 406. An operation is selected by default for each content, based on the content type. The user then rearranges content within a group, or between groups, as necessary in step 408. The user has a choice in step 410 to add more content as necessary or add more add more groups as necessary in step 412.

Figure 5:
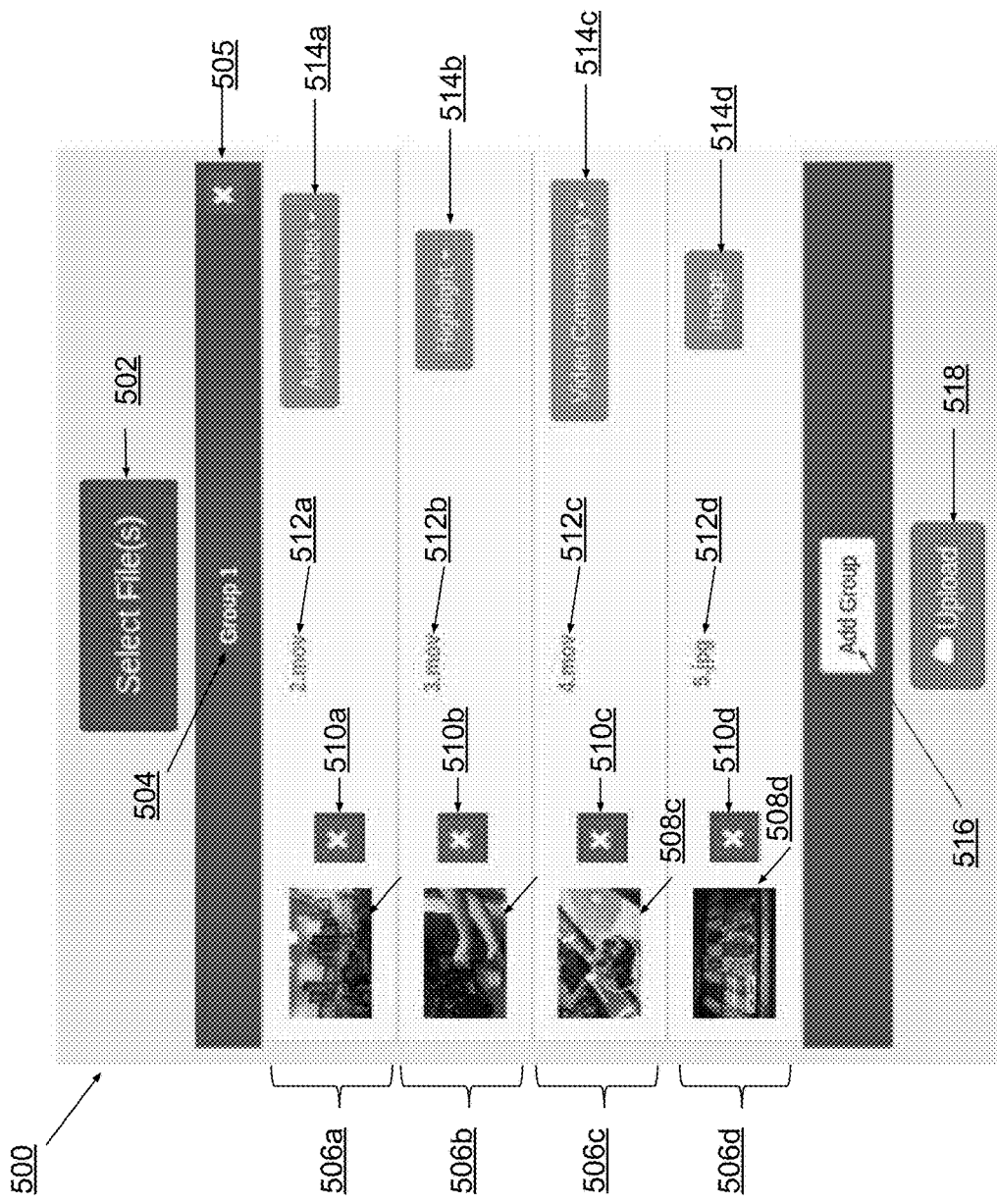
FIG. 5 is a graphic representation of associating content with one group.

FIG. 5 is a graphic representation of associating content with one group. A title 504 is associated with the group. Button 505 is associated with the group, and can be used to remove a group from the group list. Removing a group will result in the elements 506*a-d* to be deleted. A button 502 can be used to open up an interface to select content to add to the group. Elements 506*a-d* mark the content to be associated with group 504. Thumbnails 508*a-d* show a visual representation of the content. For images, the image is displayed. For video, one frame from within the video is displayed. Buttons 510*a-d* can be used to remove associated elements 506*a-d* from the group. A file name 512*a-d* is associated with each content file. Dropdown buttons 514*a-d* indicate the operation to be performed on each content file. Clicking on a dropdown button opens a menu from which a user can select an operation to perform on content files. Button 516 is used to add a new group to the group list. Button 518 is used to request that the composition module generate a video with the given grouping and operations. Elements 506*a-d* can be reordered within the group. For example, 506*a* can be dragged in between elements 506*c* and 506*d*, resulting in the elements to be ordered: 506*b*, 506*c*, 506*a*, and 506*d*.

The graphic representation shown above is only one embodiment of associating content with one group. It will be apparent to one skilled in the art that various embodiments can be practiced without these specific details.

Figure 6:
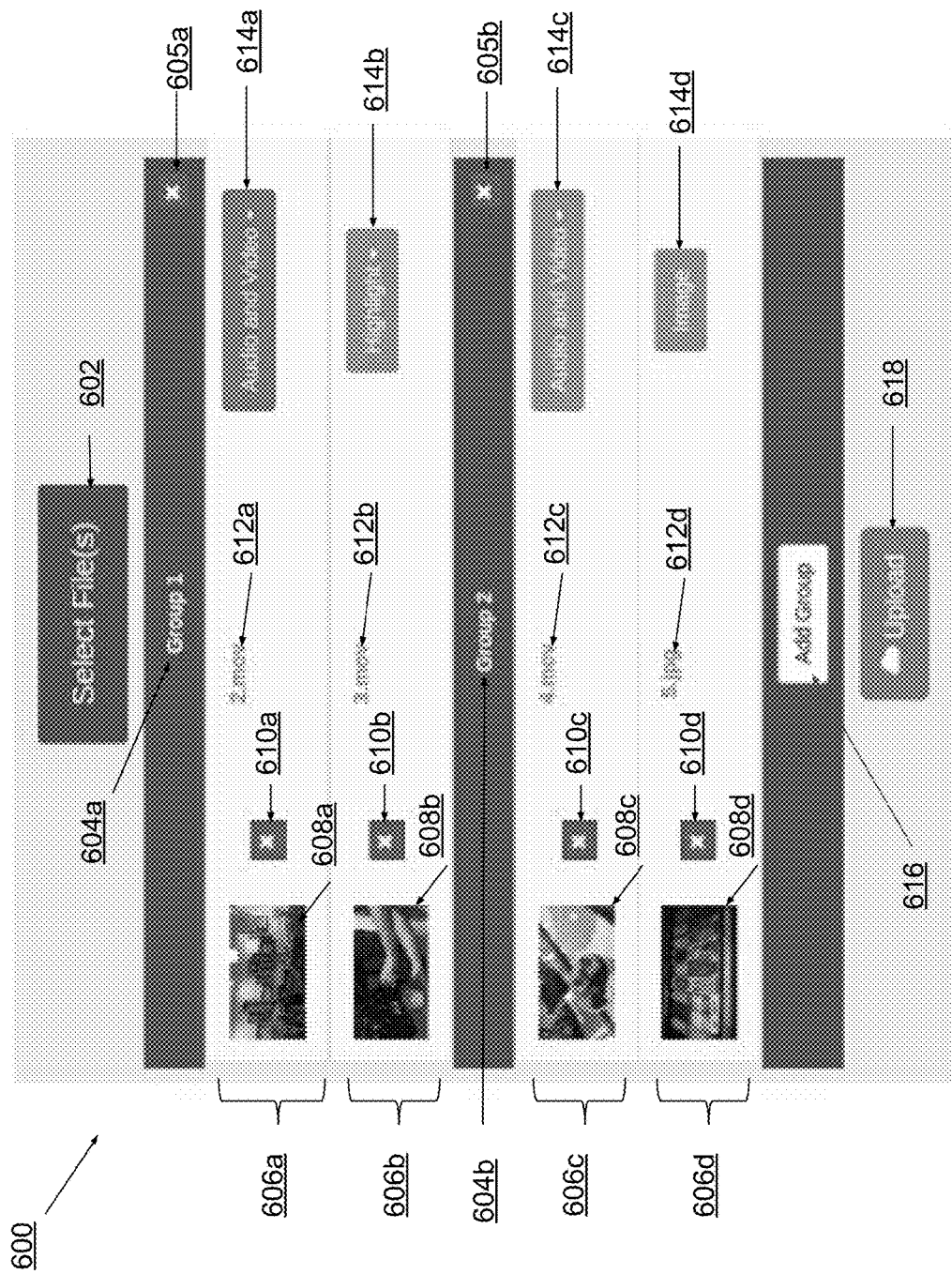
FIG. 6 is a graphic representation of associating content with multiple groups.

FIG. 6 is a graphic representation of associating content with multiple groups. Titles 604*a-b* are associated with the group. Buttons 605*a-b* are associated with each group, and can be used to remove a group from the group list. A button 602 can be used to open up an interface to select content to add to one of the groups. Elements 606*a-d* mark the content to be associated with groups 604*a-b*. Thumbnails 608*a-d* show a visual representation of the content. For images, the image is displayed. For video, one frame from within the video is displayed. Buttons 610*a-d* can be used to remove associated elements 606*a-d* from their associated group. A file name 612*a-d* is associated with each content file. Dropdown buttons 614*a-d* indicate the operation to be performed on each content file. Clicking on a dropdown button opens a menu from which a user can select an operation to perform on content files. Button 616 is used to add a new group to the group list. Button 618 is used to request that the composition module generate a video with the given grouping and operations. Elements 606*a-d* can be dragged within a group to reorder them, or dragged to a different group to change group association. For example, element 606*a* can be dragged to a position between elements 606*c* and 606*d*. This will result in the removal of element 606*a* from Group 1 and the addition of element 606*a* into Group 2, in between elements 606*c* and 606*d*.

The graphic representation shown above is only one embodiment of associating content with multiple groups. It will be apparent to one skilled in the art that various embodiments can be practiced without these specific details.

Although the invention has been described in terms of various preferred embodiments, it will be understood that numerous variations and modifications may be made without departing from the true spirit and scope thereof, as set forth in the following claims.

The invention claimed is:

1. A method for creating a multimedia composition, comprising:
   accessing, in a database, multimedia files, the multimedia composition including multimedia content of the multimedia files that is edited;
   receiving a list of groups, a group corresponding to a segment of the multimedia composition;
   for each group of the list:
   receiving an identification of one or more multimedia files for creating the segment of the multimedia composition;
   determining one or more editing parameters to process the one or more multimedia files;
   creating the segment of the multimedia composition by processing the one or more multimedia files according to the one or more editing parameters, the segment including multimedia content of the one or more multimedia files that is edited;
   creating the multimedia composition by combining multimedia content of the segments according to a sequence of the groups; and
   providing the multimedia composition to a user device for display;
   wherein one of the groups includes multiple subgroups and one of the one or more multimedia files is associated with the multiple subgroups, wherein the segment of the multimedia composition includes multiple subsegments each include a portion of multimedia content of the one multimedia file;
   wherein the editing parameters includes at least one parameter configured to determine the portion of the multimedia content to be included in each subsegment.

2. The method of claim 1, wherein the multimedia files include at least one of a video file, an audio file, an image file, and a text file.

3. The method of claim 1, further comprising storing the multimedia composition in the database.

4. The method of claim 1, wherein the one or more editing parameters include a user-defined parameter and wherein determining one or more editing parameters comprises receiving the user-defined parameter.

5. The method of claim 1, wherein the one or more editing parameters correspond to an effect selected from the group consisting of a Ken Burns effect, a video-only effect, an audio-only effect, an audio and video effect, a highlight effect, and a video commentary effect.

6. The method of claim 1, wherein determining one or more editing parameters comprises analyzing the multimedia content of the one or more multimedia files and wherein the one or more editing parameters are determined according to the analysis such that the multimedia content of the segment is optimal.

7. The method of claim 1, further comprising providing a user interface configured to enable a user to select the one or more multimedia files for each group.

8. The method of claim 1, further comprising providing a user interface configured to enable a user to define the list of groups, further comprising:
   adjusting the sequence of the groups according to a user instruction.

9. The method of claim 1, further comprising providing a user interface configured to enable a user to associate an audio file or a text file with a group.

10. A system for creating a multimedia composition, comprising:
   at least one processor;
   at least one memory device operably coupled to the at least one processor and storing instructions for execution on the at least one processor, the instructions causing the at least one processor to:
   access, in a database, multimedia files, the multimedia composition including multimedia content of the multimedia files that is edited;
   receive a list of groups, a group corresponding to a segment of the multimedia composition;
   for each group of the list:
   receive an identification of one or more multimedia files for creating the segment of the multimedia composition;
   determine one or more editing parameters to process the one or more multimedia files;
   create the segment of the multimedia composition by processing the one or more multimedia files according to the one or more editing parameters, the segment including multimedia content of the one or more multimedia files that is edited;
   create the multimedia composition by combining multimedia content of the segments according to a sequence of the groups; and
   provide the multimedia composition to a user device for display;
   wherein one of the groups includes multiple subgroups and one of the one or more multimedia files is associated with the multiple subgroups, wherein the segment of the multimedia composition includes multiple sub-segments each include a portion of multimedia content of the one multimedia file;
   wherein the editing parameters includes at least one parameter configured to determine the portion of the multimedia content to be included in each subsegment.

11. The system of claim 10, wherein the multimedia files include at least one of a video file, an audio file, an image file, and a text file.

12. The system of claim 10, wherein the one or more editing parameters include a user-defined parameter and wherein the instructions for determining one or more editing parameters cause the at least one processor to receive the user-defined parameter.

13. The system of claim 10, wherein the one or more editing parameters correspond to an effect selected from the group consisting of a Ken Burns effect, a video-only effect, an audio-only effect, an audio and video effect, a highlight effect, and a video commentary effect.

14. A computer program product for creating a multimedia composition, the computer program product comprising a non-transitory computer-readable storage medium having computer-usable program code embodied therein, the computer-usable program code configured to perform the following when executed by at least one processor:
   access, in a database, multimedia files, the multimedia composition including multimedia content of the multimedia files that is edited;
   receive a list of groups, a group corresponding to a segment of the multimedia composition;
   for each group of the list:
   receive an identification of one or more multimedia files for creating the segment of the multimedia composition;
   determine one or more editing parameters to process the one or more multimedia files;
   create the segment of the multimedia composition by processing the one or more multimedia files according to the one or more editing parameters, the segment including multimedia content of the one or more multimedia files that is edited;
   create the multimedia composition by combining multimedia content of the segments according to a sequence of the groups; and
   provide the multimedia composition to a user device for display;
   wherein one of the groups includes multiple subgroups and one of the one or more multimedia files is associated with the multiple subgroups, wherein the segment of the multimedia composition includes multiple sub-segments each include a portion of multimedia content of the one multimedia file;
   wherein the editing parameters includes at least one parameter configured to determine the portion of the multimedia content to be included in each subsegment.

15. The computer program product of claim 14, wherein the multimedia files include at least one of a video file, an audio file, an image file, and a text file.

* * * * *